United States Patent
Wood et al.

(10) Patent No.: US 9,331,318 B2
(45) Date of Patent: May 3, 2016

(54) BATTERY MODULE

(75) Inventors: Steven J. Wood, Shorewood, WI (US);
Majid Taghikhani, Franklin, WI (US);
Dale B. Trester, Milwaukee, WI (US);
Gary P. Houchin-Miller, Fox Point, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 1198 days.

(21) Appl. No.: 12/496,597

(22) Filed: Jul. 1, 2009

(65) Prior Publication Data

US 2009/0317695 A1    Dec. 24, 2009

Related U.S. Application Data

(63) Continuation of application No. PCT/US2008/050282, filed on Jan. 4, 2008.

(60) Provisional application No. 60/878,766, filed on Jan. 5, 2007.

(51) Int. Cl.
*H01M 2/12* (2006.01)
*H01M 2/10* (2006.01)
*H01M 10/42* (2006.01)
*H01M 10/625* (2014.01)
*H01M 10/6563* (2014.01)
*H01M 10/6554* (2014.01)
*H01M 10/613* (2014.01)
(Continued)

(52) U.S. Cl.
CPC ............ *H01M 2/1072* (2013.01); *H01M 2/105* (2013.01); *H01M 10/425* (2013.01); *H01M 10/613* (2015.04); *H01M 10/625* (2015.04); *H01M 10/6554* (2015.04); *H01M 10/6563* (2015.04); *H01M 10/643* (2015.04); *H01M 10/647* (2015.04)

(58) Field of Classification Search
USPC ...................... 429/53, 97, 120, 156, 159, 164
See application file for complete search history.

(56) References Cited

U.S. PATENT DOCUMENTS 5,850,909 A * 12/1998 Wagner .......................... 200/501
6,284,404 B1 * 9/2001 Horie et al. ...................... 429/59
(Continued)

FOREIGN PATENT DOCUMENTS

| DE | 19810746 A1 * | 9/1999 |
| EP | 0834952 A | 4/1998 |
| EP | 1320138 A | 6/2003 |
| WO | WO 2005043650 A2 * | 5/2005 |
| WO | WO 2007/079449 A | 7/2007 |

OTHER PUBLICATIONS

Office Action for European Application No. 08713559.6, dated Nov. 26, 2009, 3 pages.

(Continued)

*Primary Examiner* — Eli Mekhlin
(74) *Attorney, Agent, or Firm* — Fletcher Yoder P.C.

(57) ABSTRACT

A battery module that includes a plurality of electrochemical cells. Each of the electrochemical cells has a first end including at least one terminal and a second end having a vent. The plurality of electrochemical cells are arranged such that the second ends of a first set of the plurality of electrochemical cells face the second ends of a second set of the plurality of electrochemical cells. A central chamber is located between the second ends of the first set of the plurality of electrochemical cells and the second ends of the second set of the plurality of electrochemical cells. The central chamber is configured to receive gases released from the vents of the plurality of electrochemical cells.

24 Claims, 5 Drawing Sheets

(51) Int. Cl.
*H01M 10/647* (2014.01)
*H01M 10/643* (2014.01)

(56) References Cited

U.S. PATENT DOCUMENTS

| | | | | |
|---|---|---|---|---|
| 6,501,249 B1* | 12/2002 | Drori | | 320/149 |
| 2002/0119367 A1* | 8/2002 | Watanabe et al. | | 429/129 |
| 2004/0043287 A1* | 3/2004 | Bando et al. | | 429/156 |
| 2005/0285567 A1* | 12/2005 | Kim | | 320/116 |

OTHER PUBLICATIONS

International Search Report and Written Opinion for Application No. PCT/US2008/050282, mailing date Jun. 3, 2008, 10 pages.
Response to Office Action for European Application No. 08713559.6, dated Apr. 1, 2010, 10 pages.
Office Action for European Application No. 08713559.6, dated Oct. 14, 2010, 4 pages.
Response to Office Action for European Application No. 08713559.6, dated Dec. 8, 2010, 30 pages.

* cited by examiner

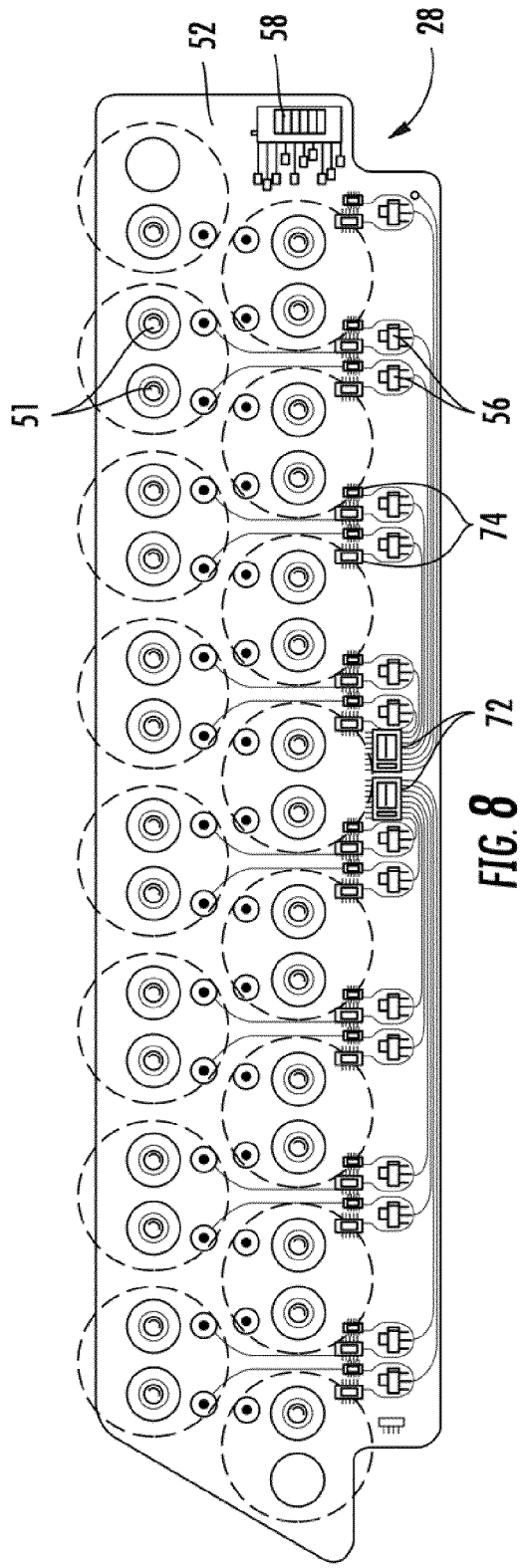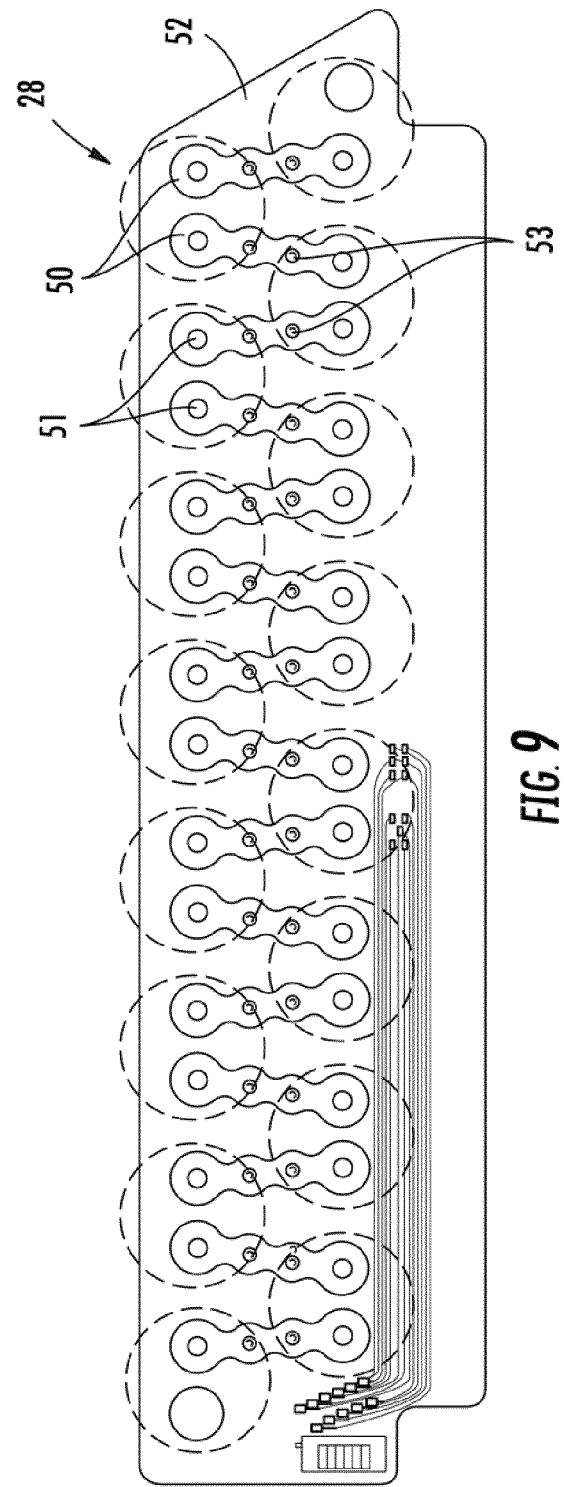

BATTERY MODULE

CROSS-REFERENCE TO RELATED PATENT APPLICATIONS

This application is a Continuation of International Patent Application No. PCT/US2008/050282, filed Jan. 4, 2008, which claims the benefit of and priority to U.S. Provisional Patent Application No. 60/878,766, filed Jan. 5, 2007, the entire disclosures of which are incorporated herein by reference.

BACKGROUND

The present application relates generally to the field of batteries and battery systems. More specifically, the present application relates to a system for packaging, connecting and regulating a plurality of batteries (e.g., in a cell assembly or module) for use in a vehicle.

It is known to provide batteries for use in vehicles such as automobiles. For example, lead-acid batteries have been used in starting, lighting, and ignition applications. More recently, hybrid vehicles have been produced which utilize a battery (e.g., a nickel-metal-hydride (NiMH) battery) in combination with other systems (e.g., an internal combustion engine) to provide power for the vehicle.

The design and management of a battery system that can be advantageously utilized in a hybrid vehicle may involve considerations such as electrical performance monitoring, thermal management, and containment of effluent (e.g., gases that may be vented from a battery cell).

SUMMARY

An exemplary embodiment relates to a battery module that includes a plurality of electrochemical cells. Each of the electrochemical cells has a first end including at least one terminal and a second end having a vent. The plurality of electrochemical cells are arranged such that the second ends of a first set of the plurality of electrochemical cells face the second ends of a second set of the plurality of electrochemical cells. A central chamber is located between the second ends of the first set of the plurality of electrochemical cells and the second ends of the second set of the plurality of electrochemical cells. The central chamber is configured to receive gases released from the vents of the plurality of electrochemical cells.

Another exemplary embodiment relates to a battery module that includes a plurality of electrochemical cells, each of the electrochemical cells having a first end and a second end, the first end having at least one terminal. A first frame member is configured to receive the first ends of a first group of the plurality of electrochemical cells. A second frame member is spaced apart from and substantially parallel to the first frame member, the second frame member configured to receive the second ends of the first group of the plurality of electrochemical cells. A third frame member is spaced apart from and substantially parallel to the second frame member, the third frame member configured to receive the second ends of a second group of the plurality of electrochemical cells. A fourth frame member is spaced apart from and substantially parallel to the third frame member, the fourth frame member configured to receive the first ends of the second group of the plurality of electrochemical cells.

Another exemplary embodiment relates to a battery system for a vehicle that includes a plurality of electrochemical cells, each of the electrochemical cells having a first end comprising at least one terminal and a second end comprising a vent, the plurality of electrochemical cells divided into a first group and a second group. A first outer frame member is configured to receive the first ends the first group of electrochemical cells. A second outer frame member is spaced apart from and substantially parallel to the first outer frame member, the second outer frame member configured to receive the first ends of the second group of electrochemical cells. A first inner frame member is spaced apart from and substantially parallel to the first outer frame member, the first inner frame member configured to receive the second ends of the first group of electrochemical cells. A second inner frame member is spaced apart from and substantially parallel to the first inner frame member, the second inner frame member configured to receive the second ends of the group portion of electrochemical cells. A central chamber is located between the first inner frame member and the second inner frame member, the central chamber being configured to receive gases released from the vents of the cells.

BRIEF DESCRIPTION OF THE DRAWINGS

FIG. 8 is a top plan view of a bus bar member for the battery module shown in FIG. 3 illustrating the use of integrated sensors.

FIG. 9 is a bottom plan view of a bus bar member for the battery module shown in FIG. 3 illustrating integrated bus bars.

DETAILED DESCRIPTION

According to an exemplary embodiment, a battery system is provided in which a single bus board member is used to connect the terminals of a plurality of cells together. The cells are arranged so that a central plenum is formed and configured to receive vented gases from the cells. The battery system is provided in a vehicle. The battery system described herein may be used in any of a variety of applications, including, for example, vehicles such as hybrid electric vehicles and plug-in electric vehicles and electric vehicles. It should be understood that the battery system may be included in a wide-variety of vehicles and may be provided within the vehicle in a variety of other locations than those shown in the FIGURES. For example, while the FIGURES show the battery system located above the rear axle, according to other exemplary embodiments, the battery system may be located under the front seats, behind the seats, or in any other suitable location.

Figure 1:
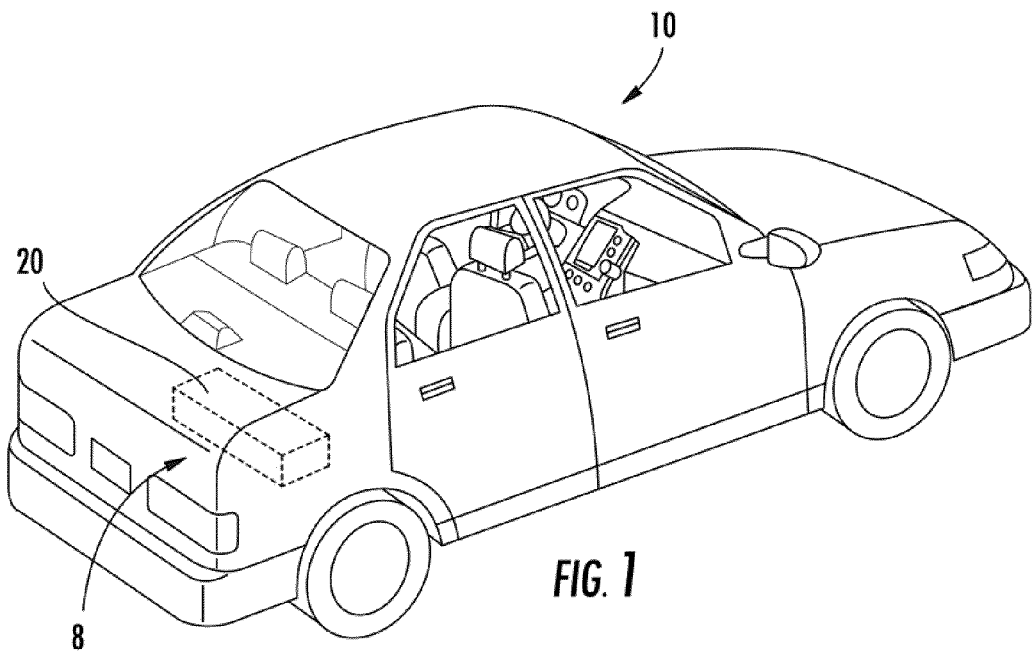
FIG. 1 is a perspective view of a vehicle having a battery module according to an exemplary embodiment.

FIG. 1 is a perspective view of a vehicle 10 (for example, a hybrid-electric vehicle (HEV) or plug-in HEV (PHEV)) having a battery module 20 provided therein according to an exemplary embodiment. The size, shape, and location of the battery module or system and the type of vehicle may vary according to a variety of other exemplary embodiments.

Figure 10:
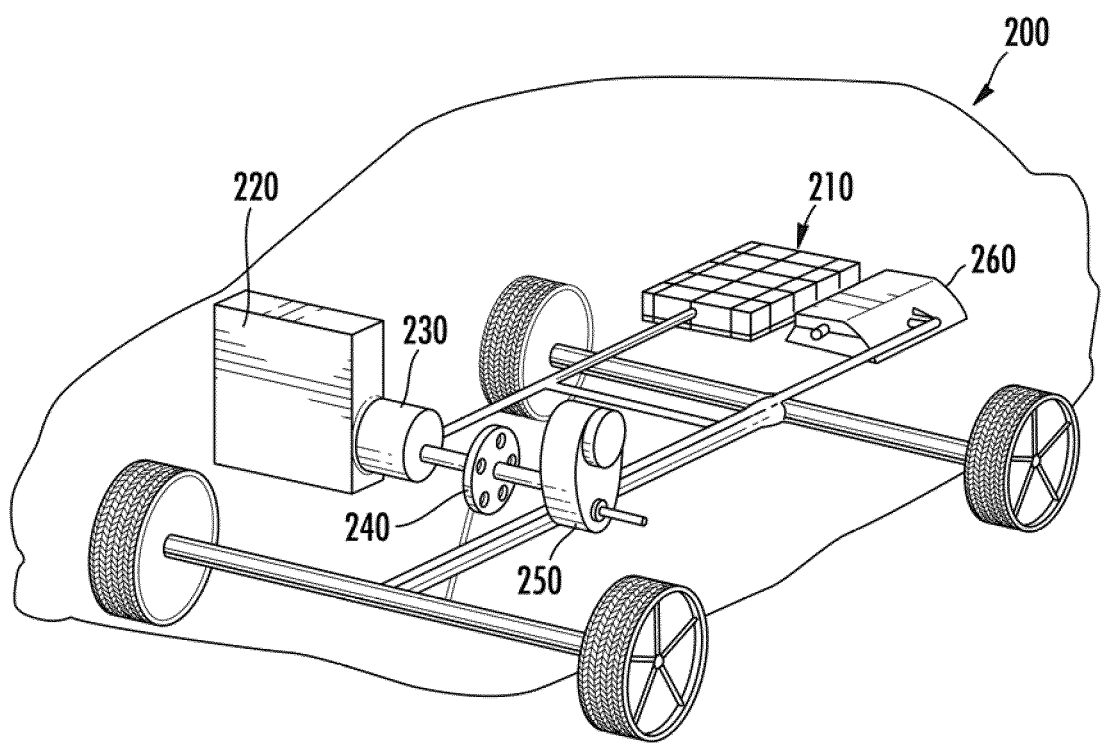
FIG. 10 is a perspective view of a vehicle according to another exemplary embodiment.

One example of the manner in which a battery assembly may be integrated within a vehicle is illustrated according to an exemplary embodiment illustrated in FIG. 10. As shown therein, a vehicle 200 (e.g. a hybrid electric vehicle) is shown according to an exemplary embodiment. Vehicle 200 includes a battery system 210 (e.g. lithium-ion battery system), an internal combustion engine 220, an electric motor 230, a power split device 240, a generator 250, and a fuel tank 260. Vehicle 200 may be powered or driven by just the battery system 210, by just the engine 220, or by both the battery system 210 and engine 220. It should be noted that other types of vehicles and configurations for the vehicle electrical system may be used according to other exemplary embodiments.

Referring now to FIGS. 1-9, a battery system 8 is shown. The battery system 8 serves to package, connect, and regulate a series of electrochemical cells 22 and is intended to be provided in a vehicle 10 (e.g., a hybrid-electric vehicle (HEV) or plug in HEV (PHEV)). According to an exemplary embodiment, the battery system 8 is provided in a chamber or area 12 that is generally separated from the rest of the vehicle interior and from the exterior environment. The battery system 8 includes a battery module 20 (e.g. a cell assembly) that includes a number of electrochemical cells or batteries 22, frame members 24 and 26, bus bar panels 28, covers 30, and an outer housing 32. The battery system 8 also includes a battery management system 34, a converter 36, and a relay module 38. The battery system 8 further includes a thermal management system to facilitate heating and/or cooling of the cells. The battery module may be lengthened or shortened to accommodate different vehicles by increasing the number of cells 22.

According to an exemplary embodiment, the electrochemical cells 22 (as shown, for example, in FIGS. 6-7) are generally cylindrical lithium-ion cells and are configured to store an electrical charge. According to other exemplary embodiments, cells could have other configurations (e.g., oval, prismatic, polygonal, etc.). According to still other exemplary embodiments, cells could be nickel metal hydride, lithium ion polymer or any other suitable types of electrochemical cells now known or hereafter developed.

While the accompanying FIGURES illustrate particular exemplary embodiments of lithium batteries and battery systems, any of a variety of lithium batteries or battery systems may be used according to various other exemplary embodiments. For example, according to various exemplary embodiments, the physical configuration of the individual cells and/or the modules may be varied according to design objectives and considerations, and the number of cells included in the system or module may differ.

Figure 6:
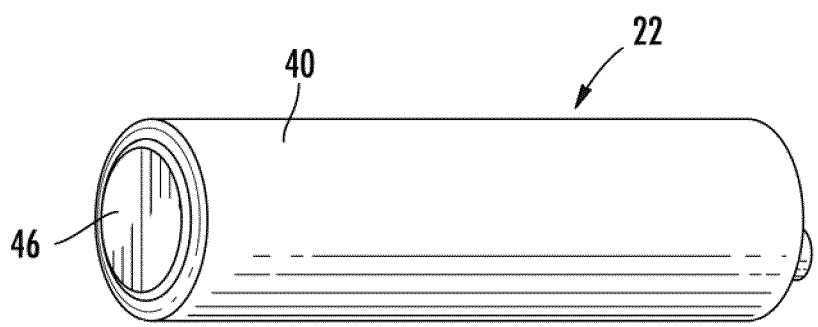
FIGS. 6-7 are perspective views of a cell for the battery module shown in FIG. 3.
Figure 7:
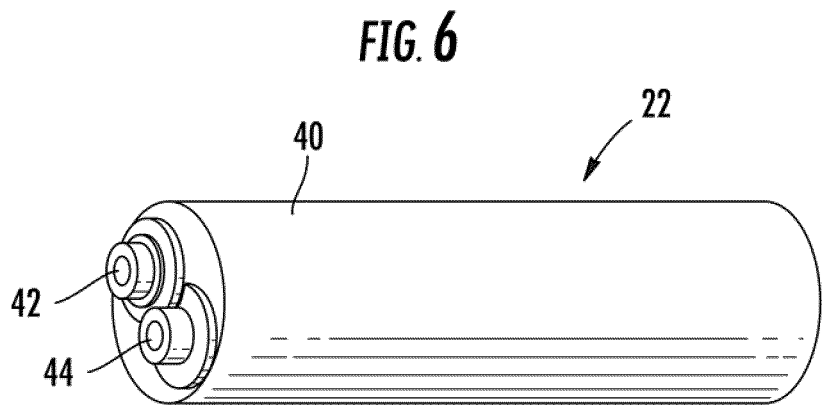

As shown in FIGS. 6-7, each of the cells 22 comprise a housing or casing (e.g., a can) 40, a negative terminal 42, a positive terminal 44, and a vent 46. The casing 40 is a generally hollow body that serves as a container for internal components (e.g., anode, cathode, electrolyte, etc.) of the cell 22 and defines the shape of the cell 22. According to an exemplary embodiment, the negative terminal 42 is a metallic member (e.g., bar, rod, etc.) that is conductively coupled to the anode or negative electrode (not shown) provided within the cell 22. The positive terminal 44 is a metallic member (e.g., bar, rod, etc.) that is conductively coupled to the cathode or positive electrode (not shown) provided within the cell 22. The vent 46 is a component or feature that allows a controlled release of pressure and gases in the cell 22. According to an exemplary embodiment, both the negative terminal 42 and positive terminal 44 of the cell are on one end of the casing 40 while the vent 46 is on the opposite side of the casing 40 from the terminals 42 and 44. According to an exemplary embodiment, the cell 22 has one positive terminal 44 and one negative terminal 42. According to other exemplary embodiments, the cell 22 may include a different number of terminals (e.g., two negative terminals and/or two positive terminals) or the terminals may be on opposite sides of the cell 22.

Figure 3:
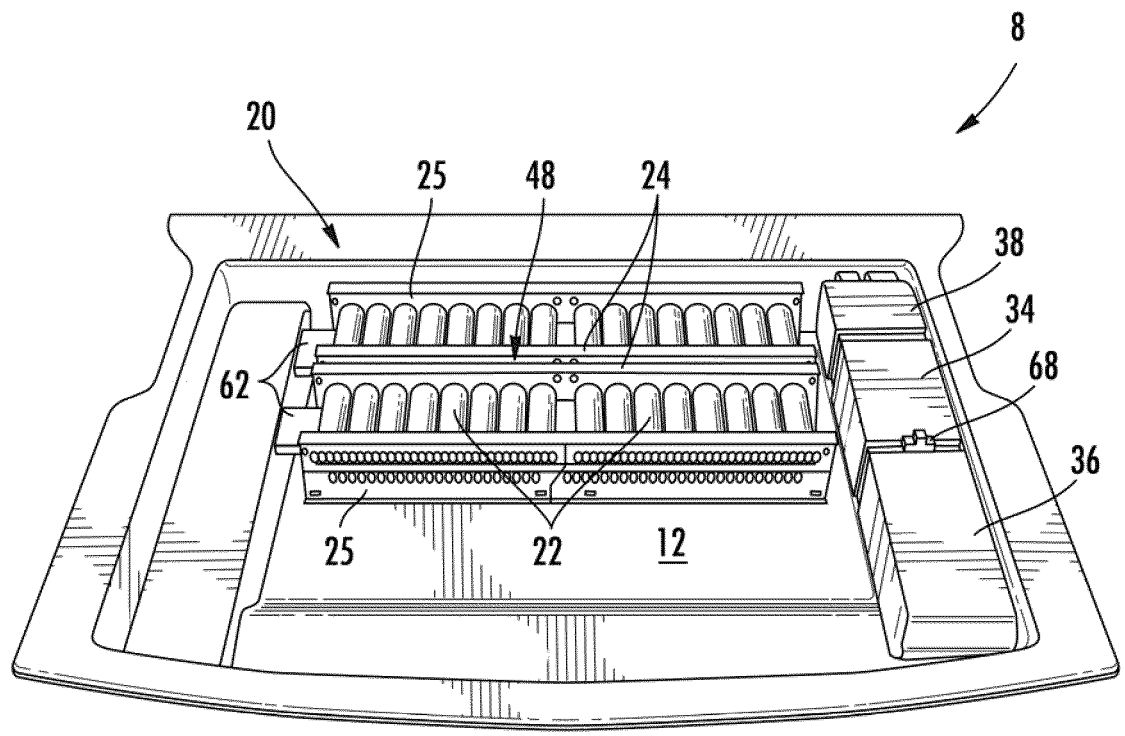
FIG. 3 is a perspective view of the portion of the vehicle shown in FIG. 2 in which the outer housing of the battery module has been removed to show interior components according to an exemplary embodiment.
Figure 5:
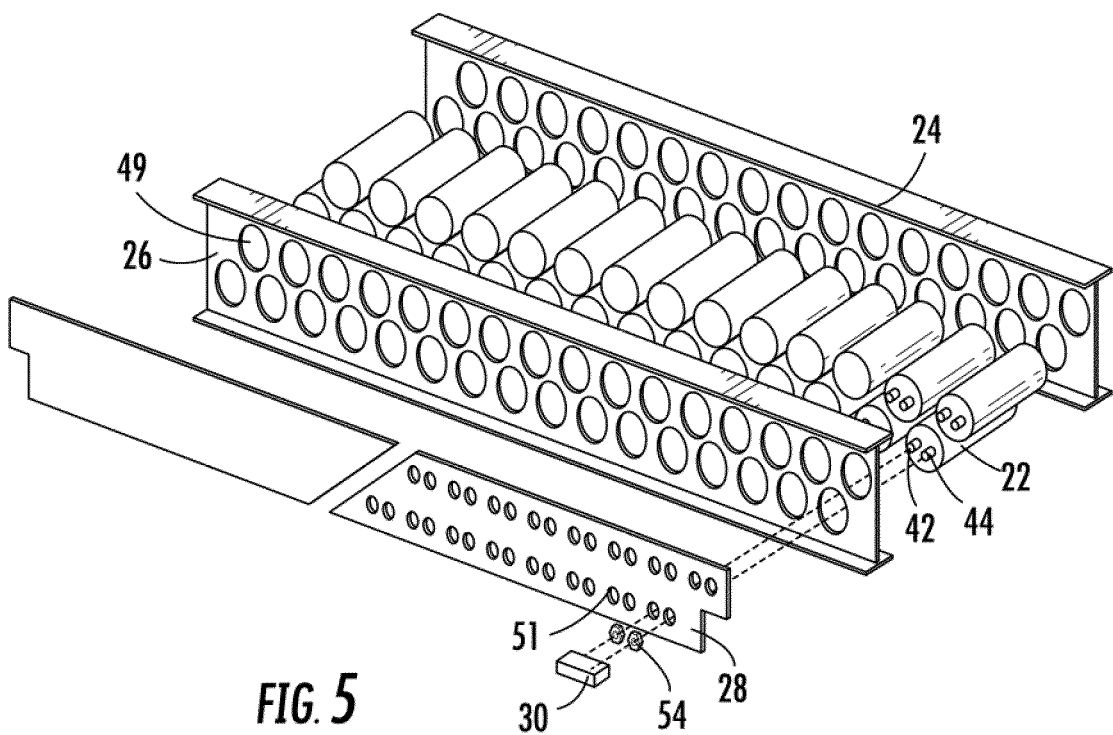
FIG. 5 is an exploded view of a portion of the battery module shown in FIG. 3.

As shown best in FIGS. 3 and 5, the frame members 24 and 26 are structures that provide a base to which other components of the battery module 20 are coupled or mounted. The battery module 20 includes two outer frame members 26 and two inner frame members 24 that are arranged parallel to the outer frame members 26. The inner frame members 24 are spaced apart to form a central chamber or central plenum air space 48. According to an exemplary embodiment, the inner frame members 24 and outer frame members 26 are substantially similar and include a plurality of holes or openings 49 that are configured to receive the cells 22. The frame members 24 and 26 locate and partially restrain the cells 22. According to other exemplary embodiments, the inner frame members 24 and outer frame members 26 may be different and include unique features to locate or interface with cells 22.

According to an exemplary embodiment, the cells 22 are arranged in two groups (e.g., packs, banks, sets, clusters, etc.). The cells 22 are provided in the space between the inner frame members 24 and outer frame members 26 and are arranged such that the vent portions 46 of the two groups face each other and the central plenum air space 48. Each group of cells includes two offset rows of cells. The vents 46 on the cells 22 extend inward past the body of the inner frame members 24 and the terminals 42 and 44 extend outward past the body of the outer frame members 26. The terminals 42 and 44 of the cells 22 are coupled to one or more conductors 50 on bus bar members 28 that are configured to electrically and mechanically couple the cells 22 together.

The battery module 20 may further include covers or guards 30. The guards 30 are formed from a generally non-conductive material such as a polymer and are configured to protect and electrically insulate the terminals 42 and 44 and fastening members 54 shown as threaded nuts in FIG. 5. Insulating the terminals 42 and 44 reduces the chance of a short circuit. According to an exemplary embodiment and referring especially to FIG. 5, each guard 30 covers a negative terminal 42 and positive terminal 44 of a cell 22 and is held on the terminals 42 and 44 with a snap-fit. In an alternative embodiment, guard 30 may be coupled to the terminals with appropriate fasteners.

The frame members 24 and 26, bus bar panels 28, and cells 22 are enclosed by an outer casing or housing 32. Frame members 24 and 26 may be coupled to the outer casing 32 or to the chamber 12 or vehicle 10 with bolts or other suitable fastening methods. According to one exemplary embodiment, the outer casing 32 may have transparent areas that allow the interior components to be seen. According to other exemplary embodiments, the outer casing 32 may not include any transparent areas. The outer casing 32 substantially encloses the battery module 20 and includes one or more openings for the thermal management system, the sensor cables, and the power cables coupled to the bus bar panels 28.

Figure 2:
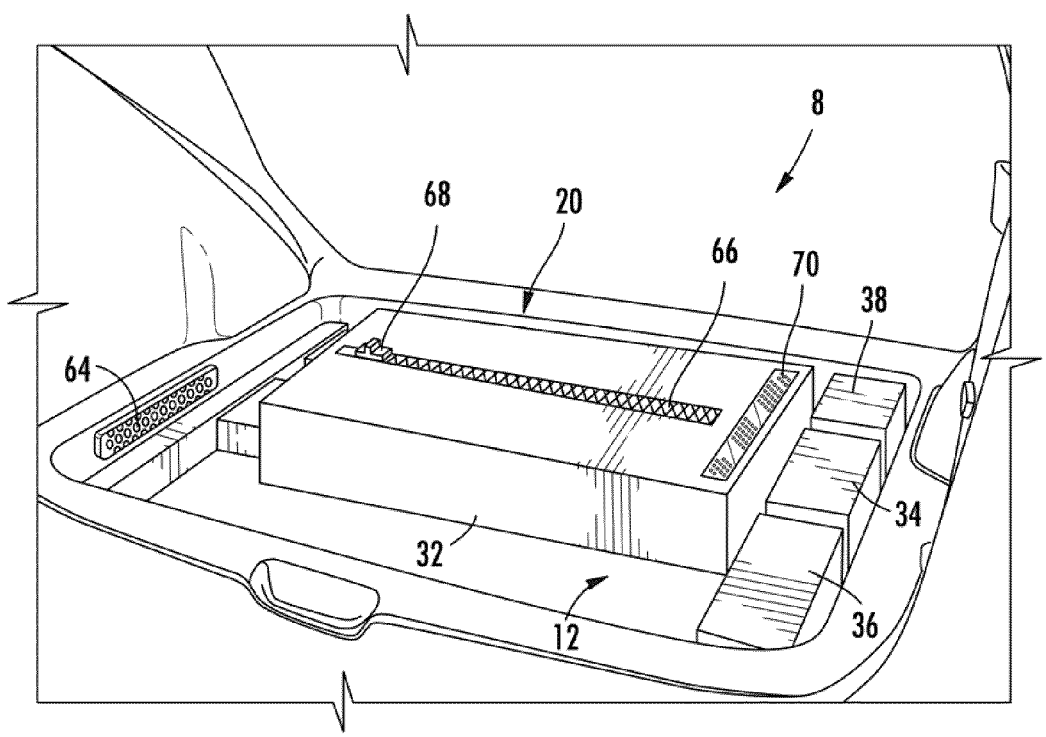
FIG. 2 is a perspective view of a portion of a vehicle having a battery module according to an exemplary embodiment.
Figure 4:
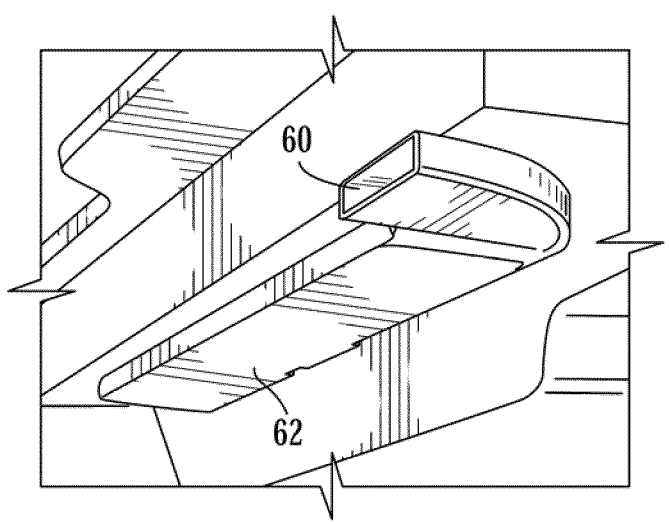
FIG. 4 is a perspective view of a portion of a thermal management system for the battery module shown in FIG. 3.

Cooling fluid (e.g., air) enters the thermal management system through an exterior inlet 60, shown in FIG. 4. According to an exemplary embodiment, the air is forced into the inlet 60 with a fan (not shown). According to other exemplary embodiments, the thermal management system may rely on the movement of the vehicle 10 to force air into the inlet 60. Referring to FIG. 3, once the fluid enters the inlet 60, it travels through ductwork 62 that splits the fluid flow into two streams. The ductwork 62 may be integrally formed with the vehicle chamber 12 so that no additional pieces or components are required. The ductwork 62 interfaces with openings in the outer housing 32 and the fluid enters the area between the outer frame members 26 and the inner frame members 24. The fluid passes over the cells 22 and absorbs heat from the cells 22. The cooling fluid exits the interior of the battery module 20 through one or more openings 70 in the outer housing 32 and into the chamber 12 that houses the battery module 20 and other components. This chamber 12 may also include a vent or other opening 64 to allow fluid to exit into the surrounding environment. One example of an outlet opening 64 is seen in FIG. 2. According to other exemplary embodiments, a closed duct system may be provided between the battery module 20 and the surrounding environment.

Gases expelled from the cells are directed to the central plenum air space 48 by virtue of the orientation of the cells 22 in the battery module 20. According to an exemplary embodiment, vent gases in the central plenum air space 48 may exit the battery module 20 through one or more openings 66 in the outer housing 32, as shown in FIG. 2. According to other exemplary embodiments, a closed duct system may be provided between the battery module 20 and the exterior environment to keep the vent gas separated from chamber 12.

A battery management system (BMS) 34 is provided to control various aspects of the battery system 8. For example, the BMS 34 may act to control the charge level and charge rate of the individual cells 22 in the system. The BMS 34 may include various circuitry and software that is configured to control such functions. The particular configuration of the BMS may vary according to various exemplary embodiments, and may include any of a variety of features configured to control or monitor various aspects of the battery system. As shown in the FIGURES, the BMS 34 may be provided as a separate module. According to other exemplary embodiments, the BMS may be integrated into the outer housing 32.

A service disconnect switch 68 is provided for the battery module 20. The service disconnect switch 68 is configured to switch the battery module 20 from a high voltage or use state and a reduced voltage or service state that is intended to reduce the risk of a dangerous electrical shock when servicing the module 20. According to one exemplary embodiment, shown in FIG. 3, the service disconnect 68 may be provided on or near the BMS 34. According to another exemplary embodiment, the service disconnect switch 68 may be provided on the outer housing of the battery module 20, as shown best in FIG. 2. The outer housing 32 may be configured so that it cannot be opened before the service disconnect switch 68 is moved to a service or reduced voltage state position.

Referring to FIGS. 5, 8, and 9, a member or element (e.g. a bus bar member) 28 is shown according to an exemplary embodiment. Referring especially to FIGS. 8 and 9, the member 28 includes a plurality of connectors or bus bars 50 that are riveted or otherwise coupled to a generally non-conductive substrate 52 by fastening members 53. The bus bars 50 are configured to couple the terminals of adjacent cells together or to an outside connector. For instance, a bus bar 50 may couple a positive terminal 44 on a first cell 22 to a negative terminal 42 on a second or neighboring cell 22 or to an outside connector. Alternatively, a bus bar 50 may couple a negative terminal 42 on a first cell 22 to a positive terminal 44 on a second or neighboring cell 22 or to an outside connector. According to an exemplary embodiment, the bus bars 50 include holes or openings 51 that receive threaded terminals 42 and 44. Fastening members 54 are threaded or otherwise coupled to the terminals 42 and 44 to couple the terminals 42 and 44 to the bus bars 50. According to other exemplary embodiments, the terminals 42 and 44 may have other configurations (e.g., blade-type, smooth posts, etc.). The member 28 is configured so that the plurality of bus bars are coupled to the batteries or cells 22 simultaneously.

The member 28 further includes sensors (e.g., voltage sensors, temperature sensors, etc.) 56, 74 that are coupled to the substrate 52 and are in communication with the cells 22. Sensors 56, 74 may be electrically coupled to the bus bars 50 and monitor the battery module 20.

The member 28 further includes one or more main connectors 72. The member 28 further includes one or more multi-pin connectors 58. The connectors 58 are electrically coupled to the sensors 56, 74 through the main connectors 72 and are configured to receive a cable (not shown). The cable communicates or transmits signals from the sensors 56, 74 to the BMS 34.

The integrated nature of the members 28 (i.e. combining the bus bars 50, sensors 56, 74 and sensor wires into a single component) reduces the overall parts count of the battery module 20 and simplifies assembly of the battery module 20. For example, instead of having to assemble multiple components (e.g., individual bus bars, sensors, wires, etc.) to the module 20, a single member 28 (having all the individual components attached to the member 28) is instead coupled to the module 20 in a single action.

It should be noted that references to "front," "back," "upper," and "lower" in this description are merely used to identify various elements as are oriented in the FIGURES, with "front" and "back" being relative the vehicle in which the battery assembly is placed.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the battery module as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages described and shown herein. For example, elements shown as integrally formed may be constructed of multiple parts or elements (e.g., outer casing, frame members, bus bar panels, etc.), the position of elements may be reversed or otherwise varied (e.g., orientation of cells), and the nature or number of discrete elements or positions may be altered or varied (e.g., more or fewer cells could be used, depending on the needs and/or space constraints of different vehicles). Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. A battery module comprising:
a plurality of electrochemical cells, each of the electrochemical cells comprising a first end having a positive terminal and a negative terminal and a second end opposite the first end having a vent, wherein the plurality of electrochemical cells are arranged such that the second ends of a first set of the plurality of electrochemical cells face the second ends of a second set of the plurality of electrochemical cells; and
a central chamber located between the second ends of the first set of the plurality of electrochemical cells and the second ends of the second set of the plurality of electrochemical cells, wherein the central chamber is configured to receive gases released from the vents of the plurality of electrochemical cells.

2. The battery module of claim 1, further comprising a member that includes a substrate and a plurality of bus bars coupled to the substrate, wherein the member is configured so that the plurality of bus bars may be coupled to the terminals of the plurality of the electrochemical cells simultaneously.

3. The battery module of claim 2, wherein the bus bars are riveted to the substrate.

4. The battery module of claim 2, wherein each of the bus bars include a first hole for receiving a terminal of a first electrochemical cell and a second hole for receiving a terminal of a second electrochemical cell.

5. The battery module of claim 2, further comprising a plurality of sensors coupled to the substrate and configured to monitor the battery module.

6. The battery module of claim 5, wherein the sensors are voltage sensors.

7. The battery module of claim 5, wherein the sensors are temperature sensors.

8. The battery module of claim 1, further comprising:
a first outer frame member configured to receive the first ends of the first set of the plurality of electrochemical cells;
a second outer frame member spaced apart from and substantially parallel to the first outer frame member, the second outer frame member configured to receive the first ends of the second set of the plurality of electrochemical cells;
a first inner frame member spaced apart from and substantially parallel to the first outer frame member, the first inner frame member configured to receive the second ends of the first set of the plurality of electrochemical cells; and
a second inner frame member spaced apart from and substantially parallel to the first inner frame member, the second inner frame member configured to receive the second ends of the second set of the plurality of electrochemical cells.

9. A battery module comprising:
a plurality of electrochemical cells, each of the electrochemical cells having a first end and a second end, the first end having a positive terminal and a negative terminal;
a first frame member configured to receive the first ends of a first group of the plurality of electrochemical cells;
a second frame member spaced apart from and substantially parallel to the first frame member, the second frame member configured to receive the second ends of the first group of the plurality of electrochemical cells;
a third frame member spaced apart from and substantially parallel to the second frame member, the third frame member configured to receive the second ends of a second group of the plurality of electrochemical cells; and
a fourth frame member spaced apart from and substantially parallel to the third frame member, the fourth frame member configured to receive the first ends of the second group of the plurality of electrochemical cells;
wherein the first ends of the first group of electrochemical cells face away from the first ends of the second group of electrochemical cells.

10. The battery module of claim 9, wherein the second ends of the plurality of electrochemical cells include a vent and the battery system further comprises a central chamber located between the second frame member and the third frame member that is configured to receive gases released from the vents.

11. The battery module of claim 9, further comprising a member coupled to a plurality of the electrochemical cells, the member comprising a plurality of bus bars coupled to a first side of the member and configured to electrically connect terminals of adjacent electrochemical cells.

12. The battery module of claim 11, wherein the member further comprises a plurality of sensors coupled to a surface thereof.

13. The battery module of claim 12, wherein the sensors are configured to sense at least one of voltage and temperature.

14. A battery system for a vehicle comprising:
a plurality of electrochemical cells, each of the electrochemical cells having a first end comprising a positive terminal and a negative terminal and a second end comprising a vent, the plurality of electrochemical cells divided into a first group and a second group;
a first outer frame member configured to receive the first ends the first group of electrochemical cells;
a second outer frame member spaced apart from and substantially parallel to the first outer frame member, the second outer frame member configured to receive the first ends of the second group of electrochemical cells;
a first inner frame member spaced apart from and substantially parallel to the first outer frame member, the first inner frame member configured to receive the second ends of the first group of electrochemical cells;
a second inner frame member spaced apart from and substantially parallel to the first inner frame member, the second inner frame member configured to receive the second ends of the second group of electrochemical cells; and
a central chamber located between the first inner frame member and the second inner frame member, the central chamber being configured to receive gases released from the vents of the first group and the second group of electrochemical cells.

15. The battery system of claim 14, further comprising a member coupled to the terminals of the first group of electrochemical cells and comprising bus bars coupled to a first side of the member, the bus bars having holes to receive the terminals of the first group of electrochemical cells.

16. The battery system of claim 14, further comprising a battery management system configured to control at least one of the charge level and charge rate of the plurality of electrochemical cells.

17. The battery system of claim 14, further comprising a thermal management system configured to cool the battery system, the thermal management system comprising a duct configured to deliver a cooling fluid to the battery system.

18. The battery system of claim 17, wherein the duct comprises a first section for the first group of electrochemical cells and a second section for the second group of electrochemical cells.

19. The battery system of claim 17, wherein the battery system is provided in a vehicle chamber and the duct is integrally formed with the vehicle chamber.

20. The battery system of claim 19, further comprising a housing that at least partially surrounds the plurality of electrochemical cells and is connected to the duct to allow the cooling fluid to enter the housing, the housing further comprising at least one opening to allow the cooling fluid from the thermal management system to exit the housing.

21. The battery system of claim 20, wherein the central chamber is connected to an opening in the housing so that gases released from the plurality of electrochemical cells may exit the central chamber.

22. The battery system of claim 21, further comprising an opening in the vehicle chamber so that at least one of the cooling fluid and the gases exiting the central chamber may exit the vehicle chamber.

23. The battery system of claim 20, further comprising a service disconnect switch coupled to the housing and configured to switch the battery system from a use state to a service state.

24. The battery system of claim 23, wherein the housing can only be removed when the disconnect switch is in the service state.

* * * * *